US006784995B2

(12) United States Patent
Merle et al.

(10) Patent No.: US 6,784,995 B2
(45) Date of Patent: Aug. 31, 2004

(54) COLORIMETER

(75) Inventors: Cormic K. Merle, Rochester, NY (US); Leonardo C. Gonzales, II, West Chester, PA (US)

(73) Assignee: Colorvision Administrative AG, Lucerne (SE)

( * ) Notice: Subject to any disclaimer, the term of this patent is extended or adjusted under 35 U.S.C. 154(b) by 57 days.

(21) Appl. No.: 10/251,426

(22) Filed: Sep. 20, 2002

(65) Prior Publication Data

US 2003/0058448 A1 Mar. 27, 2003

Related U.S. Application Data

(60) Provisional application No. 60/323,861, filed on Sep. 21, 2001.

(51) Int. Cl.[7] .................................................. G01J 3/46
(52) U.S. Cl. ....................................... 356/402; 356/225
(58) Field of Search ................................. 356/402, 218, 356/225, 432; 348/182, 184, 191, 180; 250/226, 239; 345/82; 324/404; 248/918

(56) References Cited

U.S. PATENT DOCUMENTS

| | | |
|---|---|---|
| 3,401,331 A | 9/1968 | Mussulman |
| 3,645,633 A | 2/1972 | Kisatsky et al. |
| 3,804,531 A | 4/1974 | Kosaka et al. |
| 3,998,555 A | 12/1976 | Babb |
| 4,035,834 A | 7/1977 | Drury |
| 4,134,683 A | 1/1979 | Goetz et al. |
| 4,334,782 A | 6/1982 | Thornton, Jr. et al. |
| 4,401,611 A | 8/1983 | Mansolillo et al. |
| 4,415,921 A | 11/1983 | Mulvanny et al. |

(List continued on next page.)

FOREIGN PATENT DOCUMENTS

EP  0 877 339 A2  11/1998

OTHER PUBLICATIONS

60/254,432 filed Dec. 8, 2000.*
Implementation of a Color Calibration Method for Liquid Crystal Displays. Flat Panel Display Technology and Display Metrology II, Edward F. Kelley, Tolis Voutsas, Editors, Proceedings of SPIE vol. 4295 (2001), pp. 267–278.
On the color calibration of liquid crystal display. Part of the IS&T/SPIE Conference on Display Metrology, San Jose, CA, Jan. 1999. SPIE vol. 3636 pp 154–161. A Cazes. G. Braudaway. J. Christensen.
Evaluation of Image Quality on Reflective–type LCD: Calibration Base on the PCA. Graduate School of Science and Technology, Chiba University LCD System Devices Development Center, Sharp Corp. N. Tamura (2001).
Improving color measurements of displays. SPIE vol. 2658/ 183–191. James E. Hardis, Radiometric Physics Division, National Institute of Standards & Technology, Technology Administration, U.S. Department of Commerce, Gaithersburg, MD. (Aug., 1996).

(List continued on next page.)

*Primary Examiner*—Frank G. Font
*Assistant Examiner*—Layla Lauchman
(74) *Attorney, Agent, or Firm*—Moser, Patterson & Sheridan, LLP.; Kin-Wah Tong, Esq.

(57) ABSTRACT

A colorimeter for measuring a color of light includes a color sensing device, a hanging means, and a means for reducing color distortion. The hanging means hangs the color sensing device in an operative relationship relative to a color producing device. The means for reducing color distortion reduces color distortion on the color producing device while the color sensing device is in the operative relationship relative to the color producing device.

37 Claims, 3 Drawing Sheets

U.S. PATENT DOCUMENTS

| | | | |
|---|---|---|---|
| 4,449,794 A | 5/1984 | Yamada |
| 4,551,748 A | 11/1985 | Mattle |
| 4,643,568 A | 2/1987 | Forsberg |
| 4,653,925 A | 3/1987 | Thornton, Jr. |
| 4,758,085 A | 7/1988 | Lequime et al. |
| 4,768,868 A | 9/1988 | Wakamiya et al. |
| 4,773,761 A | 9/1988 | Sugiyama et al. |
| 4,834,541 A | 5/1989 | Yamaba |
| 4,870,357 A | 9/1989 | Young et al. |
| 4,902,136 A | 2/1990 | Müeller et al. |
| 4,989,982 A | 2/1991 | Osaki et al. |
| 4,999,617 A | 3/1991 | Uemura et al. |
| 5,014,287 A | 5/1991 | Thornton et al. |
| 5,175,652 A | 12/1992 | Shimizu |
| 5,191,409 A | 3/1993 | Hamaguchi et al. |
| 5,270,540 A | 12/1993 | Skop, Jr. et al. |
| 5,272,518 A | 12/1993 | Vincent |
| 5,293,178 A | 3/1994 | Kobayashi |
| 5,371,537 A | 12/1994 | Bohan et al. |
| 5,434,412 A | 7/1995 | Sodickson et al. |
| 5,592,294 A | 1/1997 | Ota et al. |
| 5,657,079 A | 8/1997 | Thario et al. |
| 5,677,763 A | 10/1997 | Redmond |
| 5,696,550 A | 12/1997 | Aoki et al. |
| 5,739,914 A | 4/1998 | Chida et al. |
| 5,745,229 A | 4/1998 | Jung et al. |
| 5,757,483 A | 5/1998 | Pierce, III |
| 5,760,607 A | 6/1998 | Leeds et al. |
| 5,792,049 A | 8/1998 | Eppstein et al. |
| 5,812,736 A | 9/1998 | Anderson |
| 5,818,586 A | 10/1998 | Lehto et al. |
| 5,883,708 A | 3/1999 | Jung et al. |
| 5,892,585 A | 4/1999 | Lianza et al. |
| 5,926,282 A | 7/1999 | Knobloch et al. |
| D419,465 S | 1/2000 | Meng et al. |
| D421,401 S | 3/2000 | Schwarz et al. |
| 6,067,166 A | 5/2000 | Fox et al. |
| 6,163,377 A | 12/2000 | Boles et al. |
| 6,219,443 B1 | 4/2001 | Lawrence |
| 6,226,034 B1 | 5/2001 | Katayama |
| 6,262,804 B1 | 7/2001 | Friend et al. |
| 6,459,425 B1 | 10/2002 | Holub et al. |
| 6,459,485 B1 | 10/2002 | Tsurutani |
| 2003/0058202 A1 | 3/2003 | Evanicky et al. |

OTHER PUBLICATIONS

Digital imaging colorimeter for fast measurement of chromaticity coordinate and luminance uniformity of displays. Flat Panel Display Technology and Display Metrology II, Edward F. Kelley, Tolis Voutsas, Editors, D.R. Jenkins, D.C. Beuzekom. G. Kollman, C.B. Wooley, R. Rykowski Proceedings of SPIE vol. 4295 (2001).

"Flat Panel Display Measurement Standard Version 2.0 VESA (Video Electronic Standards Association Display Metrology Committee". pp. 27, 28, 188–190 and 205 (Jun. 2001).

Color Management of Reflective–Type LCD in Terms of Adaptation of the Human Visual System to Light Source Variation. Yasuhiro Yoshida and Yoichi Yamamoto LCD System Devices Development Center, SHARP Corp.., Tenri–City, Japan, pp. 129–133 (Nov. 2000).

An Assessment Standard for the Evaluation of Display Measurement Capabilities. John M. Libert, Paul A. Boynton, Edward F. Kelley, Steven W. Brown, and Yoshihoiro Ohno, National Institute of Standards and Technology Gaithersburg, Maryland. Electricity Division, Electronics and Electrical Engineering Laboratory. Engineering Laboratory (JL, PB, EK), Optical Technology Division, Physics Laboratory (SB, YO) Technology Administration, U.S. Department of Commerce. IS & T/SID Eighth Color Image Conference, pp. 217–221 (Nov. 2000).

Colorimetric Characterization of the Apple Studio Display (Flat Panel LCD). Mark D. Fairchild and David R. Wyble, Jul. 1998. Munsell Color Science Laboratory, Center for Imaging Science, Rochester Institute of Technology, 54 Lomb Memorial Drive, Rochester, NY, (Jul., 1998).

A New Uniformity Measurement Method for LCDs Panels. Part of the IS&T/SPIE Conference on Display Metrology, San Jose, CA, Jan., 1999. SPIE vol. 3636. Thierry R. Leroux, pp. 191–198.

Stray Light Elimination in Making Projection Display Measurements. Paul A. Boynton and Edward F. Kelly Part of the IS&T/SPIE Conference on Display Metrology, San Jose, CA, Jan., 1999. SPIE vol. 3636, pp. 232–239.

Colorimetric Characterization of There Computer Displays (LCD and CRT). Jason E. Gibson and Mark D. Fairchild. Jan., 2000. Munsell Color Science Laboratory, Center for Imaging Science, Rochester Institute of Technology, 54 Lomb Memorial Drive, Rochester, NY.

Colorimetric Tolerances of Various Digital Image Displays. Jason E. Gibson, Mark D. Fairchild and Steven L. Wright, Munsell Color Science Laboratory, Center for Imaging Science, Rochester Institute of Technology, 54 Lomb Memorial Drive, Rochester, NY. IBM T.J. Watson Research ) Center, Yorktown Heights, New York, pp. 295–300 (Jan. 2000).

Status of TFTLCD Color and Metrology, Steven L. Wright, Kenneth Ho, Alan Lien. IBM T.J. Watson Research Center, Yorktown Heights, NY, pp. 301–304. (Nov. 2000).

NIST Calibration Facility for Display Colorimeters. Steven W. Brown and Yoshi Ohno. National Institute of Standards and Technology, Gaithersburg, MD 20899. Part of the IS&T/SPIE Conference on Display Metrology, San Jose, CA, Jan., 1999, SPIE vol. 3636, pp. 162–169.

LCD Visual Performance: Characterization and Evaluation. Part of the IS&T/SPIE Conference on Display Metrology, San Jose, CA, Jan., 1999, SPIE vol. 3636. Michael E. Becker, pp. 170–183.

* cited by examiner

COLORIMETER

This application claims the benefit of U.S. Provisional Application No. 60/323,861, filed Sep. 21, 2001.

STATEMENT REGARDING FEDERALLY SPONSORED RESEARCH & DEVELOPMENT

This invention was not made by an agency of the United States Government nor under contract with an agency of the United States Government.

BACKGROUND OF THE INVENTION

The present invention relates to color measuring devices. It finds particular application in conjunction with devices for measuring colors produced by a liquid crystal display ("LCD") monitor and will be described with particular reference thereto. It will be appreciated, however, that the invention is also amenable to other like applications.

Colorimeters are known for measuring colors of a sample. One type of conventional colorimeter has been developed for measuring colors produced by a monitor (display). Two (2) common types of displays include, for example, cathode ray tube ("CRT") monitors and liquid crystal display ("LCD") monitors. Reasons for measuring colors displayed on a monitor include identifying actual colors being displayed and, optionally, comparing the actual displayed colors against standard accepted colors. One reason for making such a comparison is for modifying the displayed colors to more closely match the standard accepted colors (e.g., calibrating the monitor). For various reasons, monitors must be calibrated on a regular basis.

Until now, colorimeters have been designed to be used with CRT monitors. Because LCD monitors have several distinct characteristics compared to CRT monitors, colorimeters designed for use with CRT monitors do not always work well with LCD monitors. For example, LCD monitors noticeably change color with viewing angle. Furthermore, because LCD monitors include a soft viewing screen, colors displayed on the screen may change as a function of pressure applied to the screen. In fact, colors are often completely destroyed if too much pressure is applied to a soft viewing screen. It is to be understood that additional differences, which are not mentioned, exist between CRT and LCD monitors.

For the reasons discussed above, colorimeters designed for CRT monitors do not always work well for measuring colors produced by LCD monitors. Therefore, colorimeters designed for CRT monitors are not practical for calibrating LCD monitors.

The present invention provides a new and improved apparatus and method which addresses the above-referenced problems.

SUMMARY OF THE INVENTION

In one embodiment, a colorimeter for measuring a color of light includes a color sensing device, a hanging means, and a means for reducing color distortion. The hanging means hangs the color sensing device in an operative relationship relative to a color producing device. The means for reducing color distortion reduces color distortion on the color producing device while the color sensing device is in the operative relationship relative to the color producing device.

In one aspect, the hanging means includes a suspension device and a means for suspending the color sensing device from the suspension device.

In another aspect, the means for suspending includes a flexible material secured to the color sensing device and the suspension device.

In another aspect, the flexible material includes rubber.

In another aspect, the means for suspending further includes a dock. The flexible material is secured to the color sensing device via the dock. A counterweight is secured to the suspension device so that the counterweight balances the color sensing device, dock, and means for reducing color distortion.

In another aspect, a means substantially limits light received by the sensing device to be light emitted from the color producing device within a predetermined angle.

In another aspect, the means for substantially limiting light is a baffle.

In another aspect, the means for reducing color distortion includes a housing secured to the color sensing device. A flat surface on the housing contacts the color producing device. The flat surface substantially minimizes any pressure points on the color producing device.

In another embodiment, a colorimeter for measuring a color of light includes a color sensing device. A suspension device places the color sensing device in a first plane for operative relationship relative to a color producing device. A color distortion reduction device places the color sensing device in a second plane for operative relationship relative to the color producing device and substantially eliminates color distortion on the color producing device.

In another embodiment, a system for measuring a color of light includes a color producing device. A color detection device measures a color produced by the color producing device. A suspension device, secured to the color producing device, places the color sensing device in a substantially parallel plane for operative relationship relative to the color producing device. A color distortion reduction device places the color sensing device in a substantially perpendicular plane for operative relationship relative to the color producing device and substantially eliminates color distortion on the color producing device.

In another embodiment, a method for measuring a color of light includes placing a color sensing device in a substantially parallel plane for operative relationship relative to a color producing device. The color sensing device and a color distortion reduction device are placed in a substantially perpendicular plane for operative relationship relative to the color producing device. The color sensing device is secured to the color distortion reduction device, which substantially eliminates color distortion on the color producing device. Light is received from the color producing device in the color sensing device.

BRIEF DESCRIPTION OF THE DRAWINGS

In the accompanying drawings which are incorporated in and constitute a part of the specification, embodiments of the invention are illustrated, which, together with a general description of the invention given above, and the detailed description given below, serve to exemplify the embodiments of this invention.

DETAILED DESCRIPTION OF ILLUSTRATED EMBODIMENT

Figure 1A:
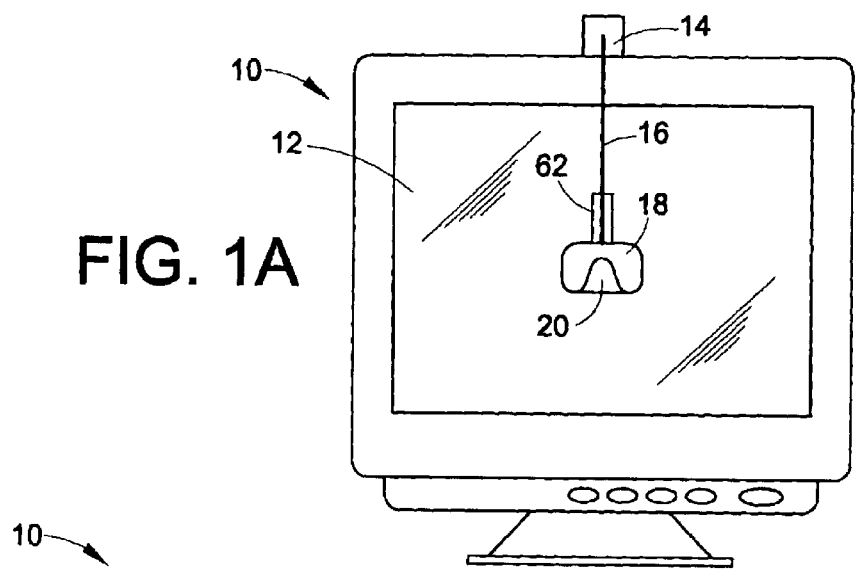
FIGS. 1A and 1B illustrate front and side views, respectively, of a colorimeter system according to one embodiment of the present invention.
Figure 1B:
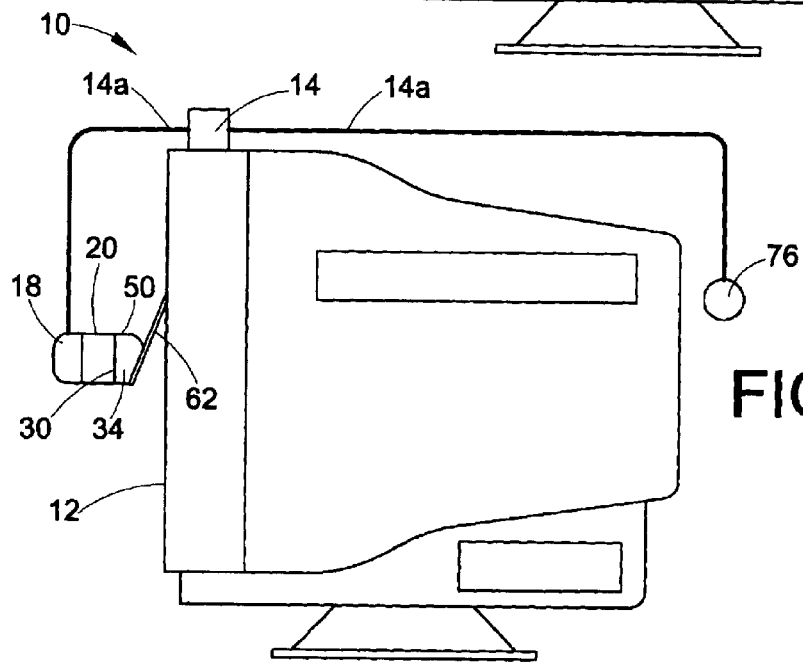

FIGS. 1A and 1B illustrate a colorimeter system 10 for measuring color from a color producing device 12 according to the present invention. In one embodiment, the color producing device 12 is a monitor having a soft screen display, which distorts colors upon the application of pressure (e.g., a liquid crystal display ("LCD") monitor). However, it is to be understood that other types of monitors (e.g., cathode ray tube ("CRT") monitors) are also contemplated in other embodiments.

The colorimeter system 10 includes a suspension device 14, a suspension means 16, a dock 18, and a color sensing device (e.g., a colorimeter) 20. The suspension device 14 is secured to the monitor 12 and, optionally, includes portions 14a, 14b that extend in different directions (e.g., substantially opposite directions) over and beyond the edges of the monitor 12.

Figure 2:
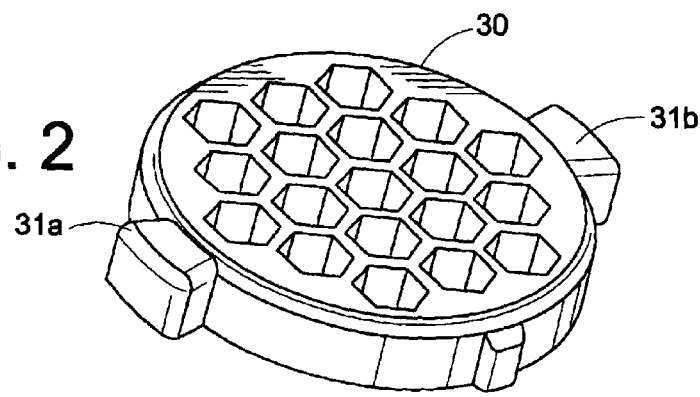
FIG. 2 illustrates a perspective view of a baffle according to one embodiment of the present invention.
Figure 3A:
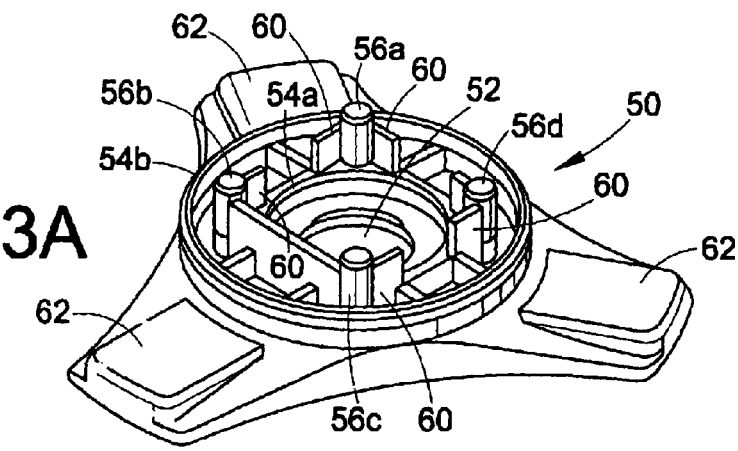
FIG. 3A illustrates an isometric top view of a baffle housing according to one embodiment of the present invention.
Figure 3B:
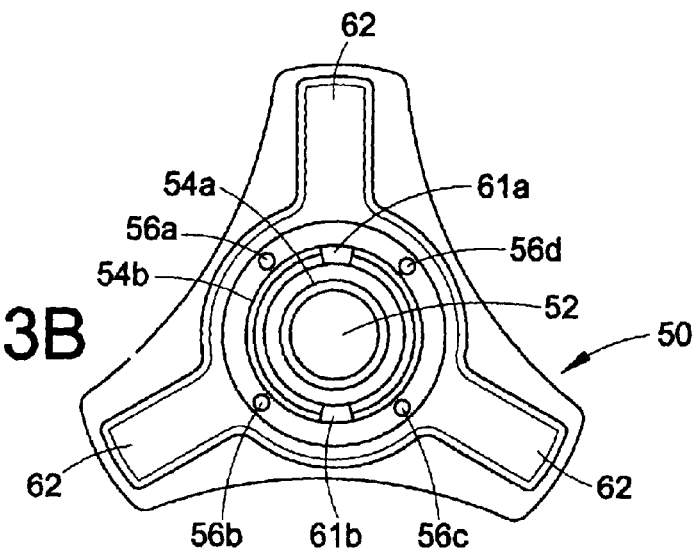
FIG. 3B illustrates a bottom view of the baffle housing according to one embodiment of the present invention.
Figure 3C:
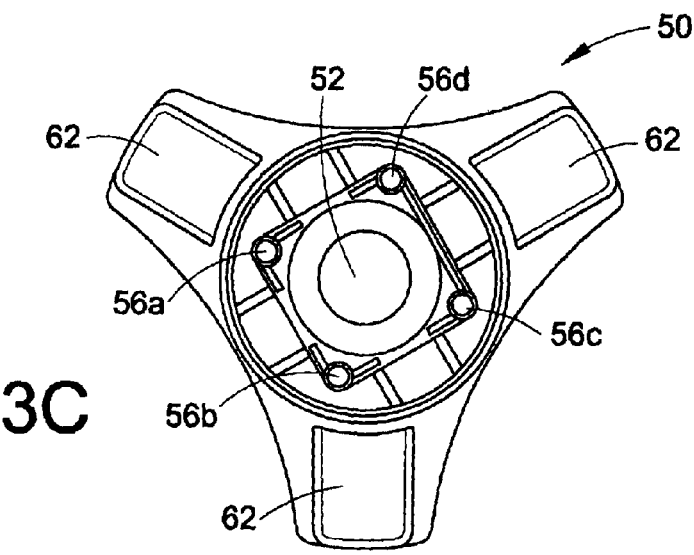
FIG. 3C illustrates a top view of a baffle housing according to one embodiment of the present invention.

With reference to FIGS. 1A, 1B, and 2, a baffle 30 is designed to substantially limit light received by the sensing device 20 to be light emitted from the monitor 12 within a predetermined angle (e.g., light emitted from the monitor 12 within ±45°). For example, substantially the only light received by the sensing device 20 is light that is emitted by the monitor 12 at ±45° relative to the sensing device 20. In other words, the baffle 30 blocks light, which is not emitted by the monitor 12 within the predetermined angle relative to the sensing device 20, from reaching the sensing device 20. In one embodiment, the predetermined angle is ±45°. However, other predetermined angles are also contemplated in other embodiments. In this manner, light including distorted color(s), due to large emission angles, is prevented from entering the colorimeter 20.

In one embodiment, the baffle 30 includes ears 31a, 31b and one or more passages 32. The passages 32 are shown in the embodiment illustrated in FIG. 2 as honeycomb-shaped; however, other shapes for the passages 32 are contemplated in alternate embodiments. The passages 32 direct light emitted from monitor 12 within the predetermined angle to the sensing device 20. Light emitted from the monitor 12 outside the predetermined angle is prevented from reaching the sensing device 20. It is to be understood that the passages 32 are designed and constructed as a function of the predetermined angle. Therefore, the design and construction of the passages 32 in one embodiment, which passes light emitted by the monitor 12 at ±45° relative to the sensing device 20, is different than the design and construction of the passages 32 in another embodiment, which, for example, passes light emitted by the monitor 12 at ±30° relative to the sensing device 20.

Optionally, a filter 34 is secured between the baffle 30 and the sensing device 20. The filter 34 blocks light of a predetermined frequency emitted from the monitor 12. In one embodiment, the filter 34 is an infrared ("IR") filter (e.g., a piece of IR blocking glass). Such an IR filter 34 is useful for LCD monitors that tend to emit light at wavelengths greater than about 850 nanometers (e.g., IR light), which has the potential to adversely affect colorimeters not specifically designed to block IR light. It is to be understood that although the filter 34 is described in one embodiment as being an IR filter, other embodiments including other types of filters are also contemplated.

With reference to FIGS. 1B, 2, and 3A–3C, a baffle housing 50 covers the baffle 30. The housing 50 is designed to serve multiple functions. For example, the housing 50 optionally includes a recess 52 in the center (see FIG. 3B) for securing the filter 34 in place. Furthermore, the housing 50 optionally includes a pair of ribs 54a, 54b for securing the honeycomb baffle 30 in place. In one embodiment, bosses (e.g., four (4)) 56a, 56b, 56c, 56d secure the baffle housing 50 to the sensing device 20 in a stable and repeatable manner. Partial walls 60 (see FIG. 3A) emanate from the bosses 56. The walls 60 are designed such that the baffle housing 50 is restricted to fit into the sensing device 20 in only a single direction. Such a restriction guarantees that the orientation of the baffle housing 50 relative to the sensing device 20 is constant. Similarly, slots 61a, 61b on the housing 50 are designed to mate with the ears 31 to guarantee that the orientation of the housing 50 relative to the baffle 30 is constant.

Optionally, the baffle housing 50 also includes a large, flat surface for a foot 62 to be attached. The foot 62 is typically a soft (e.g., foam) material. In one embodiment, the housing includes three (3) foam feet 62. However, other embodiments, which include other numbers of foam feet 62 are also contemplated. The foam feet 62 ensure the pressure points are dispersed on the monitor 12 and substantially minimized when the colorimeter 20 is taking measurements. Consequently, any color distortion on the portion of the monitor 12 that projects light to the color sensing device 20 is minimized. In this sense, the feet 62 act as a means for reducing color distortion on the monitor 12.

Figure 4:
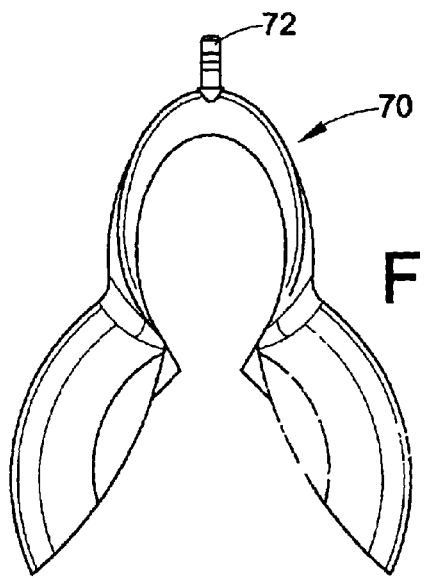
FIG. 4 illustrates a dock according to one embodiment of the present invention.
Figure 5A:
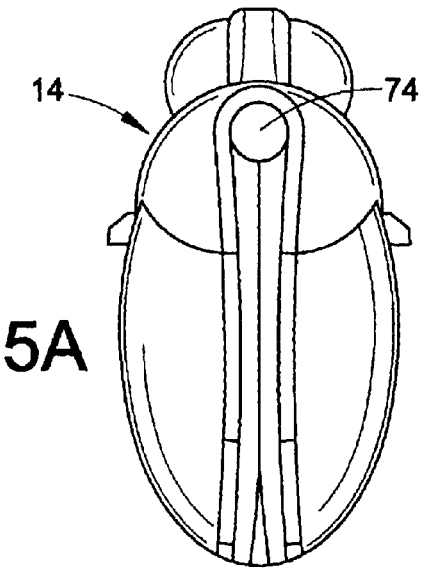
FIGS. 5A and 5B illustrate a hanger according to one embodiment of the present invention.
Figure 6:
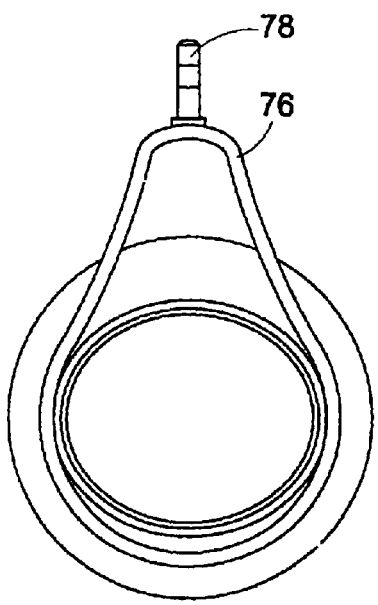
FIG. 6 illustrates a counterweight according to one embodiment of the present invention.

With reference to FIG. 4, a dock 70 is designed to slip over and firmly hold the color sensing device 20. A barb 72 is located at one end of the dock 70. The barb 72 is designed to secure a first end of the suspension means 16. In one embodiment, the suspension means 16 includes a flexible material (e.g., a string, ribbon, a flexible plastic, or stretchable material such as a rubber (e g., a rubber tubing)). However, other embodiments, in which the suspension means 16 includes a substantially rigid material (e.g., a rigid plastic) are also contemplated. During use, the suspension means 16 is inserted through a hole 74 in the suspension device 14 (see FIG. 5A). A second end of the rubber tubing 16 terminates at a counterweight 76 (see FIGS. 1B and 6), which has a barb 78 at an end. The barb 78 is designed to secure a second end of the suspension means 16. The counterweight 76 is contemplated to have a mass approximately equal to that of the dock 18 and color sensing device 20.

In use, the suspension means 16 (e.g., tubing) is passed through the suspension device 14. The ends of the suspension means 16 are affixed to the dock 70 and the counterweight 76. The suspension device 14 is set on the top, front edge of the monitor 12, which is to be measured with the color sensing device 20. The dock 70 is placed (suspended or hung) in front of the monitor 12 and the counterweight 76 is suspended (hung) to the rear. The counterweight 76 balances the color sensing device 20, dock 70, and means for reducing color distortion.

The baffle housing 50, with the foam foot 62, baffle 30 and IR filter 34 in place, is attached to the color sensing device 20 such that the baffle 30 covers the entrance aperture of the color sensing device 20. The color sensing device 20 is then loaded into the dock 70 so that it gently rests against the monitor 12 with only the foam foot 62 in contact with the monitor 12. In this manner, the color sensing device 20 is placed in a plane (e.g., substantially parallel to the monitor 12 to provide selective horizontal and selective vertical placement of the color sensing device relative to the monitor 12) when the dock 70 is placed in front of the monitor 12; similarly, the color sensing device 20 is placed on a line (e.g., substantially perpendicular to the screen of monitor 12) to provide selective placement of the color sensing device away from the screen of monitor 12) when the dock 70 is gently rested against the monitor 12. In this manner, the suspension device 14, suspension means 16, dock 18, and counterweight 76 act as a hanging means for placing the color sensing device 20 in an operative relationship to the monitor 12.

Figure 5B:
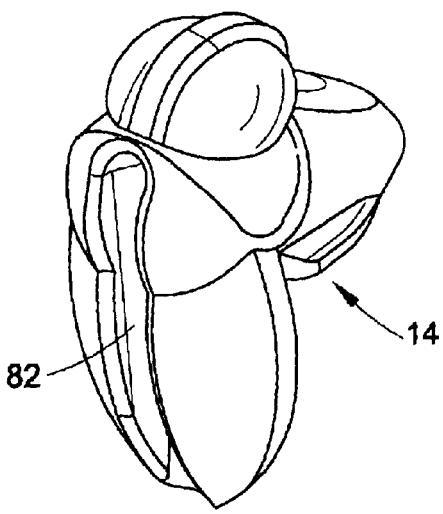

The vertical position of the color sensing device 20 with respect to the monitor 12 is adjusted by sliding the hanging means 16 through the suspension device 14. Once the proper vertical position is found, the hanging means 16 is pushed into a slot 82 on the back of the suspension device 14 (see FIG. 5B). In this manner, the hanging means 16 is locked in place in the hanger 14.

Once the color sensing device 20 is correctly positioned relative to the monitor 12, measurements of colors produced by the monitor 12 may be taken. These measurements may be used, for example, to calibrate the monitor 12. Typically, in order to achieve the most accurate readings, the color sensing device 20 is positioned substantially in the center of the monitor 12. Therefore, the color sensing device 20 may be adjusted to a variety of monitor sizes via the hanging means 16.

While the present invention has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the invention, in its broader aspects, is not limited to the specific details, the representative apparatus, and illustrative examples shown and described. Accordingly, departures may be made from such details without departing from the spirit or scope of the applicant's general inventive concept.

We claim:

1. A calorimeter for measuring a color of light, comprising:
   a color sensing device;
   a hanging means for hanging the color sensing device in an operative relationship relative to a color producing device, wherein the hanging means includes:
      a suspension device; and
      means for suspending the color sensing device from the suspension device, wherein the means for suspending includes:
         a flexible material connecting the color sensing device and the suspension device;
         a dock, the flexible material connecting the color sensing device via the dock; and
         a counterweight connected to the suspension device, the counterweight balancing the color sensing device, dock, and means for reducing color distortion and
   means for reducing color distortion on the color producing device while the color sensing device is in the operative relationship relative to the color producing device.

2. A colorimeter for measuring a color of light, comprising:
   a color sensing device;
   a hanging means for hanging the color sensing device in an operative relationship relative to a color producing device;
   means for reducing color distortion on the color producing device while the color sensing device is in the operative relationship relative to the color producing device; and
   means for substantially limiting light received by the sensing device to be light emitted from the color producing device within a predetermined angle.

3. The colorimeter as set forth in claim 2, wherein the means for substantially limiting is a baffle.

4. A calorimeter for measuring a color of light, comprising:
   a color sensing device;
   a suspension device for placing the color sensing device in a plane for operative relationship relative to a color producing device;
   a color distortion reduction device for placing the color sensing device in a line, which is substantially perpendicular to the color producing device, for operative relationship relative to the color producing device and substantially eliminating color distortion on the color producing device; and
   a baffle between the color producing device and the color sensing device for substantially limiting light received by the sensing device to be light emitted from the color producing device within a predetermined angle.

5. The calorimeter as set forth in claim 4, wherein the predetermined angle is ±45°.

6. A system for measuring a color of light, comprising:
   a color producing device;
   a color detection device for measuring a color produced by the color producing device;
   a suspension device, secured to the color producing device, for placing the color sensing device in a substantially parallel plane for operative relationship relative to the color producing device;
   a color distortion reduction device for placing the color sensing device in a line substantially perpendicular to the color producing device for operative relationship relative to the color producing device and substantially eliminating color distortion on the color producing device; and
   a counterweight secured to the suspension device for balancing the color sensing device in the operative relationship relative to the color producing device.

7. A system for measuring a color of light, comprising:
   a color producing device;
   a color sensing device for measuring a color produced by the color producing device;
   a suspension device, secured to the color producing device, for placing the color sensing device in a substantially parallel plane for operative relationship relative to the color producing device;
   a color distortion reduction device for placing the color sensing device in a line substantially perpendicular to the color producing device for operative relationship relative to the color producing device and substantially eliminating color distortion on the color producing device; and
   a baffle between the color producing device and the color sensing device for substantially limiting light received by the color sensing device to be light emitted from the color producing device within a predetermined angle.

8. A method for measuring a color of light, the method comprising:
   placing a color sensing device in a substantially parallel plane for operative relationship relative to a color producing device;
   placing the color sensing device and a color distortion reduction device in a substantially perpendicular plane for operative relationship away from the color producing device, the color sensing device being secured to the color distortion reduction device, which substantially eliminates color distortion on the color producing device;

receiving light from the color producing device in the color sensing device; and placing a baffle, for substantially limiting light received by the sensing device to be light emitted from the color producing device within a predetermined angle, between the color producing and color sensing devices.

9. A method for measuring a color of light, the method comprising:

placing a color sensing device in a substantially parallel plane for operative relationship relative to a color producing device;

placing the color sensing device and a color distortion reduction device in a substantially perpendicular plane for operative relationship away from the color producing device, the color sensing device being secured to the color distortion reduction device, which substantially eliminates color distortion on the color producing device;

receiving light from the color producing device in the color sensing device;

securing a suspension device to the color producing device;

securing the color sensing device to the suspension device for placing the color sensing device in the operative relationship relative to the color producing device; and securing a counterweight to the suspension device for balancing the color sensing device.

10. A system for measuring a color of light, comprising:
a color sensing device;
a suspension means for suspending the color sensing device in a selectively operative relationship relative to a color producing device wherein the selectively operative relationship includes a selected horizontal position and a selected vertical position;
a housing for placing the color sensing device a selected distance away from the surface of the color producing device; and
means for reducing color distortion on the color producing device while the color sensing device is in the selectively operative relationship relative to the color producing device.

11. The system for measuring a color of light of claim 10 wherein the means for reducing color distortion comprises:
a substantially planar surface, the color distortion being reduced along the entire surface.

12. The system for measuring a color of light of claim 10 wherein the suspension means comprises:
a flexible material.

13. The system for measuring a color of light of claim 10 further comprising:
a counter weight configured to releasably secure to the suspension means to counterbalance the weight of the color sensing device.

14. The system for measuring a color of light of claim 10 wherein the means for reducing color distortion comprises:
a substantially planar surface for minimizing pressure on the color producing device; and
at least one aperture in the substantially planar surface configured to allow the passage of light.

15. The system for measuring a color of light of claim 14 wherein the surface area of the at least one aperture is less than one square inch.

16. The system for measuring a color of light of claim 14 wherein surface area of the substantially planer surface is greater than twice the surface area of the at least one aperture.

17. The system for measuring a color of light of claim 14 wherein the substantially planer surface includes a substantially circular portion.

18. The system for measuring a color of light of claim 14 wherein the substantially planer surface further includes a soft material for contacting the surface of the color producing device.

19. The system for measuring a color of light of claims 18 wherein the soft material comprises foam.

20. The system for measuring a color of light of claim 10 further comprising:
a baffle enclosed in the housing configured to limit the angle of light received by the color sensing device from the color producing device.

21. The system for measunng a color of light of claim 20 wherein the baffle comprises:
a plurality of passages configured to limit the angle of light received by the color sensing device.

22. The system for measuring a color of light of claim 20 wherein the plurality of passages are substantially cylindrical.

23. The system for measuring a color of light of claim 20 wherein the plurality of passages comprises:
at least three substantially cylindrical openings configured to limit the angle of light received by the color sensing device.

24. The system for measuring a color of light of claim 20 wherein the plurality of passages comprises:
a plurality of honeycomb openings configured to limit the angle of light received by the color sensing device.

25. The system for measuring a color of light of claim 20 wherein the plurality of passages comprises:
at least three honeycomb openings configured to limit the angle of light received by the color sensing device.

26. The system far measuring a color of light of claim 20 further comprising:
a filter configured to block light wavelengths of a predetermined frequency.

27. The system for measuring a color of light of claim 26 wherein the filter blocks wavelengths within the infrared frequency spectrum.

28. The system for measuring a color of light of claim 26 wherein the filter blocks wavelengths with a frequency greater than about 850 nanometers.

29. The system for measuring a color of light of claim 26 wherein the filter is positioned between the baffle and the color sensing device.

30. A colorimeter for measuring a color of light, comprising:
a color sensing device;
a hanging means for hanging the color sensing device in an operative relationship relative to a color producing device, wherein the hanging means includes a flexible material connected to the color sensing device;
means for reducing color distortion on the color producing device while the color sensing device is in the operative relationship relative to the color producing device; and
means for substantially limiting light received by the sensing device to be light emitted from the color producing device within a predetermined angle.

31. The calorimeter as set forth in claim 30, wherein the flexible material is plastic.

32. A colorimeter for measuring a color of light, comprising:
a color sensing device;
a counterweight; and a flexible suspension means secured to the color sensing device and the counterweight;

wherein the counterweight is configured to at least partially counter the weight of the color sensing device when the color sensing device is in an operative position.

33. The colorimeter as set forth in claim 2, wherein the means for substantially limiting light is a passage.

34. The colorimeter as set forth in claim 3, wherein the baffle includes a passage.

35. A colorimeter for measuring a color of light, comprising:

a color sensing device;

a hanging means for hanging the color sensing device in a selective horizontal and selective vertical relationship relative to a color producing device;

means for reducing color distortion on the color producing device while the color sensing device is in the selective relationship relative to the color producing device; and means for substantially limiting light received by the sensing device to be light emitted from the color producing device within a predetermined angle.

36. A calorimeter for measuring a color of light, comprising:

a color sensing device;

a flexible hanging means for hanging the color sensing device in a selectively horizontal and a selectively vertical relationship relative to a color producing device;

means for reducing color distortion on the color producing device while the color sensing device is in the selective relationship relative to the color producing device; and a counterweight secured to the hanging means, the counterweight at least partially balancing the color sensing device and the means for reducing color distortion.

37. The system for measuring a color of light of claim 20 further comprising:

a filter configured to block light wavelengths of a predetermined frequency, wherein the baffle is integral with the color sensing device, and the filter is between the baffle and the color sensing device.

* * * * *